(12) United States Patent
Morphet

(10) Patent No.: US 11,004,172 B2
(45) Date of Patent: *May 11, 2021

(54) MEMORY MANAGEMENT FOR SYSTEMS FOR GENERATING 3-DIMENSIONAL COMPUTER IMAGES

(71) Applicant: Imagination Technologies Limited, Kings Langley (GB)

(72) Inventor: Stephen Morphet, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,311

(22) Filed: Jan. 4, 2020

(65) Prior Publication Data

US 2020/0143509 A1 May 7, 2020

Related U.S. Application Data

(63) Continuation of application No. 16/127,677, filed on Sep. 11, 2018, now Pat. No. 10,552,938, which is a (Continued)

(51) Int. Cl.
*G06T 15/50* (2011.01)
*G06T 1/60* (2006.01)
(Continued)

(52) U.S. Cl.
CPC ............... *G06T 1/60* (2013.01); *G06F 12/02* (2013.01); *G06T 11/40* (2013.01); *G06T 15/005* (2013.01);
(Continued)

(58) Field of Classification Search
CPC ......... G06T 15/005; G06T 15/00; G06T 1/60; G06T 15/80; G06T 2200/04; G06T 17/00; G09G 2360/122; G09G 5/393
See application file for complete search history.

(56) References Cited

U.S. PATENT DOCUMENTS 5,295,235 A   3/1994  Newman
5,392,385 A   2/1995  Evangelisti et al.
(Continued)

FOREIGN PATENT DOCUMENTS

EP   0903694 A   3/1999
GB   2298111 A   8/1996
(Continued)

*Primary Examiner* — Hau H Nguyen
(74) *Attorney, Agent, or Firm* — Potomac Law Group, PLLC; Vincent M DeLuca

(57) ABSTRACT

A memory management system for generating 3-dimensional computer images is provided. The memory management system includes a device for subdividing an image into a plurality of rectangular areas, a memory for storing object data pertaining to objects in the image which fall in each rectangular area, a device for storing the object data in the memory, a device for deriving image data and shading data for each rectangular area from the object data, a device for supplying object data for each rectangular area from the respective portion of the memory and, if the rectangular area contains objects also falling in at least one other rectangular area, also from the global list, to the deriving device, and a device for storing the image data and shading data derived by the deriving device for display. The memory includes at least one portion allocated to each rectangular area and at least one portion allocated as a global list.

20 Claims, 8 Drawing Sheets

Related U.S. Application Data continuation of application No. 15/463,348, filed on Mar. 20, 2017, now Pat. No. 10,102,608, which is a continuation of application No. 14/817,486, filed on Aug. 4, 2015, now Pat. No. 9,613,598, which is a continuation of application No. 12/798,134, filed on Mar. 30, 2010, now Pat. No. 9,098,933, which is a continuation of application No. 11/704,483, filed on Feb. 9, 2007, now Pat. No. 7,719,539, which is a continuation of application No. 10/798,160, filed on Mar. 11, 2004, now abandoned, which is a continuation of application No. 09/877,708, filed on Jun. 8, 2001, now abandoned.

(51) Int. Cl.

| | | |
|---|---|---|
| *G06T 17/20* | (2006.01) | |
| *G06T 15/80* | (2011.01) | |
| *G09G 5/39* | (2006.01) | |
| *H04N 19/42* | (2014.01) | |
| *G06F 12/02* | (2006.01) | |
| *G06T 11/40* | (2006.01) | |
| *G09G 5/36* | (2006.01) | |
| *G09G 3/00* | (2006.01) | |
| *G06T 15/00* | (2011.01) | |

(52) U.S. Cl.
CPC .............. *G06T 15/80* (2013.01); *G06T 17/20* (2013.01); *G09G 3/003* (2013.01); *G09G 5/363* (2013.01); *G09G 5/39* (2013.01); *H04N 19/42* (2014.11); *G06T 2200/04* (2013.01); *G09G 2310/04* (2013.01); *G09G 2360/122* (2013.01)

(56) References Cited

U.S. PATENT DOCUMENTS

| | | | |
|---|---|---|---|
| 5,522,018 | A | 5/1996 | Takeda et al. |
| 5,729,669 | A | 3/1998 | Appleton |
| 5,729,672 | A | 3/1998 | Ashton |
| 5,852,443 | A | 12/1998 | Kenworthy |
| 5,886,701 | A | 3/1999 | Chauvin et al. |
| 6,657,635 | B1 | 12/2003 | Hutchins et al. |
| 6,697,063 | B1 | 2/2004 | Zhu |
| 6,701,420 | B1 | 3/2004 | Hamilton et al. |
| 6,720,964 | B1 | 4/2004 | Fowler et al. |
| 6,897,858 | B1 | 5/2005 | Hashimoto et al. |

FOREIGN PATENT DOCUMENTS

| | | |
|---|---|---|
| GB | 2336086 A | 10/1999 |
| GB | 2343603 A | 5/2000 |
| JP | 10-177657 A | 6/1998 |
| WO | 97/06512 A2 | 2/1997 |

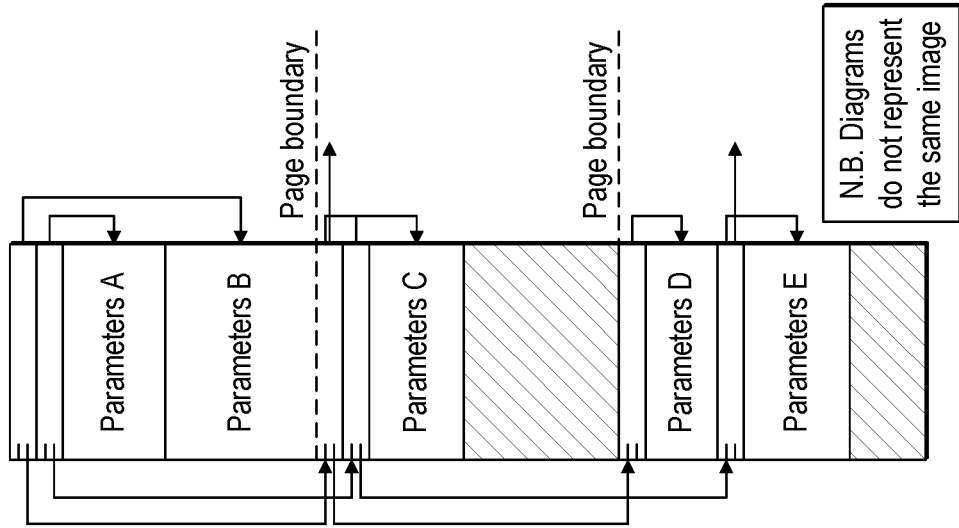
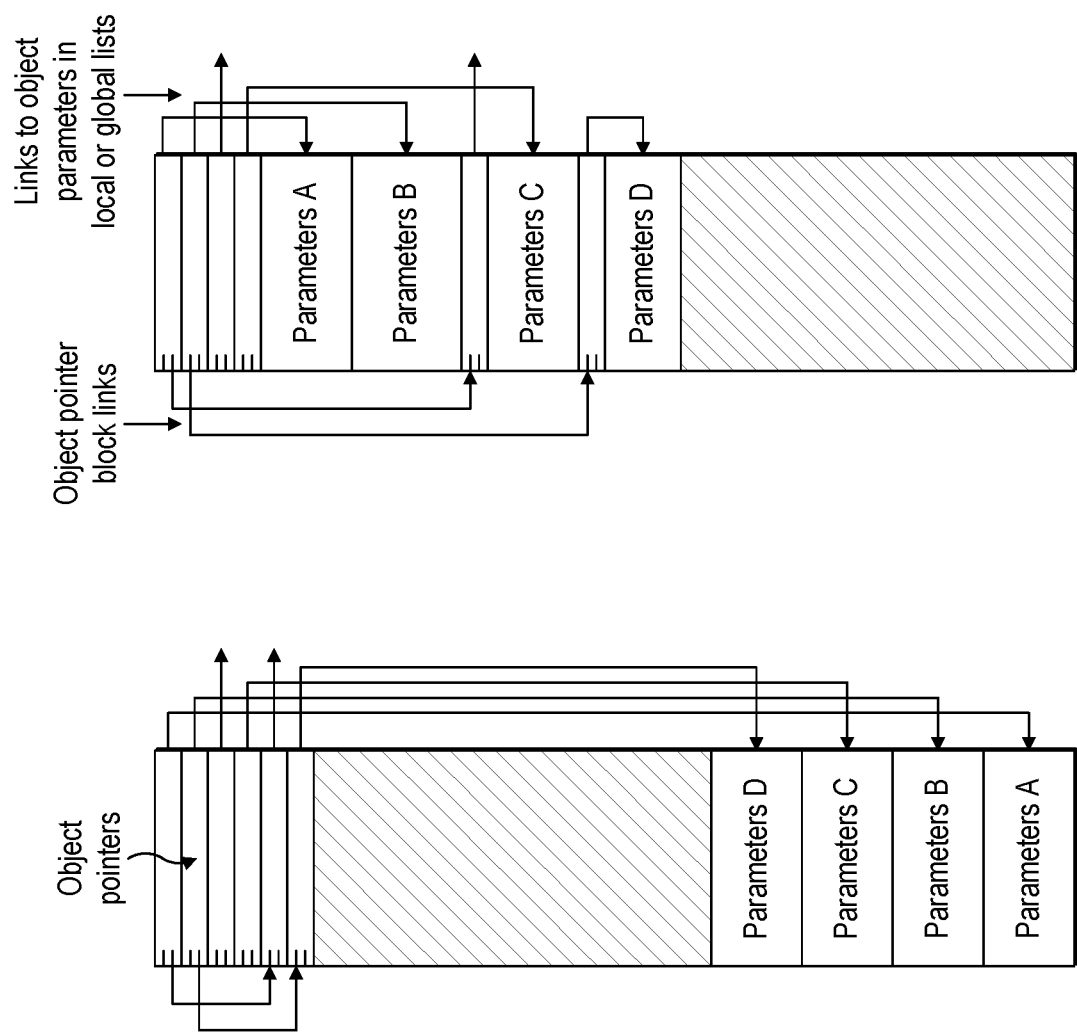
FIG. 4A
FIG. 4B
FIG. 4C

MEMORY MANAGEMENT FOR SYSTEMS FOR GENERATING 3-DIMENSIONAL COMPUTER IMAGES

CROSS-REFERENCE TO RELATED APPLICATIONS

This application is a continuation of U.S. application Ser. No. 12/798,134 filed Mar. 30, 2010, now U.S. Pat. No. 9,098,933, which is a continuation of U.S. application Ser. No. 11/704,483, filed Feb. 9, 2007, now U.S. Pat. No. 7,719,539, which is a continuation of U.S. application Ser. No. 10/798,160, filed Mar. 11, 2004 (now abandoned), which is a continuation of U.S. application Ser. No. 09/877,708, filed Jun. 8, 2001 (now abandoned), hereby incorporated herein by reference.

FIELD OF THE INVENTION

This invention relates to memory management for use with systems for generating 3-dimensional computer generated images.

BACKGROUND OF THE INVENTION

In our British Patent No. 2281682, there is described a 3-D rendering system for polygons in which each object is seen to be viewed as defined in a set of surfaces which are infinite. Each elementary area of the screen in which an image is to be displayed has a ray projected through it from a viewpoint into the 3-dimensional scene. The location of the intersection of the projected ray with each surface is then determined. From these intersections, it is then possible to determine whether any intersected surface is visible at that elementary area. The elementary area is then shaded for display in dependence on the results of the determination.

The system can be implemented in a pipeline type processor comprising a number of cells, each of which can perform an intersection calculation with a surface. Thus, a large number of surface intersections can be computed simultaneously. Each cell is loaded with a set of coefficients defining the surface for which it is to perform the intersection test.

A further improvement is described in our UK Patent Application No. 2298111. In this, the image plane is subdivided into sub-regions or tiles such that tiles can be processed in turn. It is proposed to use a variable tile size and to project a bounding box around complex objects so that only those tiles falling within the bounding box require processing. This is done by firstly determining the distribution of objects on the visible screen in order for a suitable tile size to be selected. The surfaces which define the various objects are then stored in a list, known as the display list, thereby avoiding the need to store identical surfaces for each tile, since one object made of many surfaces could appear in a number of tiles. Object pointers which identify the objects in the display list are also stored. There is one object pointer list per tile. The tiles can then be rendered in turn using the ray casting technique described above until all objects within each tile are processed. This is a useful method because no effort needs to be made to render objects which are known not to be visible in a particular tile.

A further improvement on this is proposed in our International Patent Application No. PCT/GB99/03707, in which any tiles within the bounding box which are not required to display a particular object are discarded before rendering. A block diagram of the type of processor used is shown in FIG. 1. This comprises a tile accelerator unit 2 which performs the tiling operations referred to above and supplies the tile information to a display list memory 4. This in turn supplies tile object data for processing to the image synthesis processor (ISP) 6 which performs the ray/surface intersection tests referred to above. This derives image data which comprises object identification and depth data. After this, the thus derived image data is supplied to a texturing and shading processor (TSP) 8 which applies texturing and shading data to surfaces which have been determined as visible and outputs image shading data to a frame store.

Most 3-D graphic systems use what is known as immediate mode rendering. This type of rendering avoids the needs to store a copy of the entire scene in the display list memory. Instead, each polygon is rendered the moment that it is presented to the rendering hardware. This has the advantage of avoiding the storage requirements of the display list memory. However, it also precludes the considerable optimisation which are possible with the type of rendering described in our British Patent No. 2281682 and improved on in our British Patent Application No. 2298111. Advantages such as deferred texturing and translucency sorting are possible using this type of architecture.

The complexity of scenes which it is necessary to render using 3-D graphic systems is increasing as hardware becomes more powerful. However, this presents a problem for display list based renderers because the display list storage requirements also increase. In the past, if the display list memory became exhausted, parts of the scene would simply not be rendered. Image corruption of this sort is no longer considered acceptable. The cost of memory, which is not falling as fast as scene complexity is rising, makes increasing the amount of memory in the system unfeasible.

SUMMARY OF THE INVENTION

Preferred embodiments of the present invention provide a method of managing the display list in such a manner as to impose an upper bound on the memory consumption, whilst at the same time attempting to minimise the memory bandwidth consumed by the system. This may be achieved by storing the state of the system (ISP and TSP) to memory before rendering of a tile is complete, and reloading this state at a later time in order to finish the rendering. We refer to this technique as "z/frame buffer load and store".

In a preferred embodiment, this screen is divided up into a number of regions called macro-tiles, in which each of these consists of a rectangular region of the screen composed of a number of smaller tiles. Memory in the display list is then divided into blocks and these are listed in a free store list. Blocks from the free store are then allocated to the macro-tiles as required. The tiling operation stores polygon parameter data and object pointers for surfaces in each block associated with each macro-tile in which they are visible. When the memory for the parameters fills up, or reaches some predefined threshold, the system selects a macro-tile, performs a z/frame buffer load, and renders the contents of the macro-tile before saving it using a z/frame buffer store operation. Upon completion of such a render, the system frees any memory blocks associated with that macro-tile, thereby making them available for further parameter storage. The z/frame buffer load and store operations are restricted to the macro-tiles that are actually rendered rather than every tile on the screen as was previously: the case. Tiling of either the remainder of the current frame or of the next frame to be displayed then continues in parallel with macro-tile renders and the allocation of blocks of memory from the same pool to further macro-tiles. It is not necessary to provide any double buffering of the parameter list and thus the memory requirements of the system are further reduced. The invention is defined with more precision in the appended claims to which reference should now be made.

BRIEF DESCRIPTION OF THE DRAWINGS

Preferred embodiments of the invention will now be described in detail by way of example with reference to the accompanying drawings in which:

FIGS. 4a, b, and c show alternative arrangements for the allocation of data in blocks in the display list in accordance with an embodiment of the invention;

DETAILED DESCRIPTION

Figure 1:
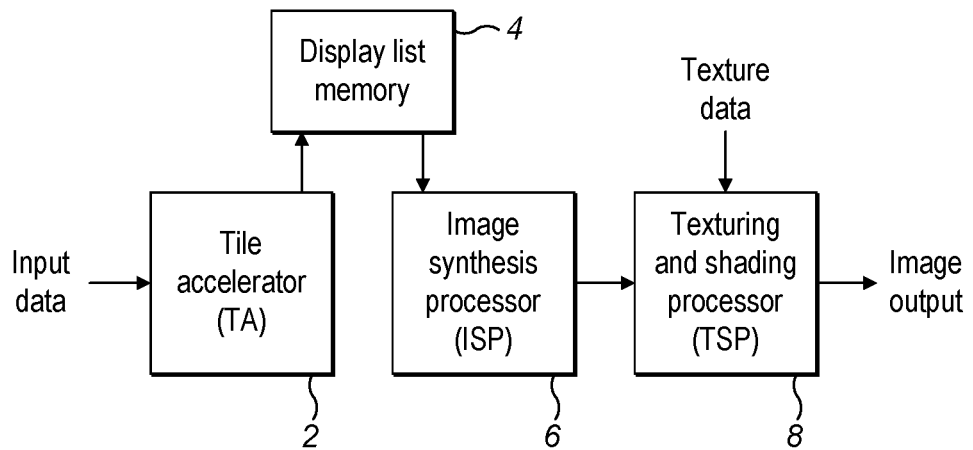
FIG. 1 shows a schematic diagram of the rendering and texturing system referred to above.

In the system of FIG. 1, polygons which are to be displayed are broken down into planar triangles. The data representing these is transformed by either hardware or software into a screen space representation and is then stored in local memory. The tiling process then performed by the tile accelerator 2 creates a list of pointers to the transformed triangle data for each tile in the scene.

Figure 2:
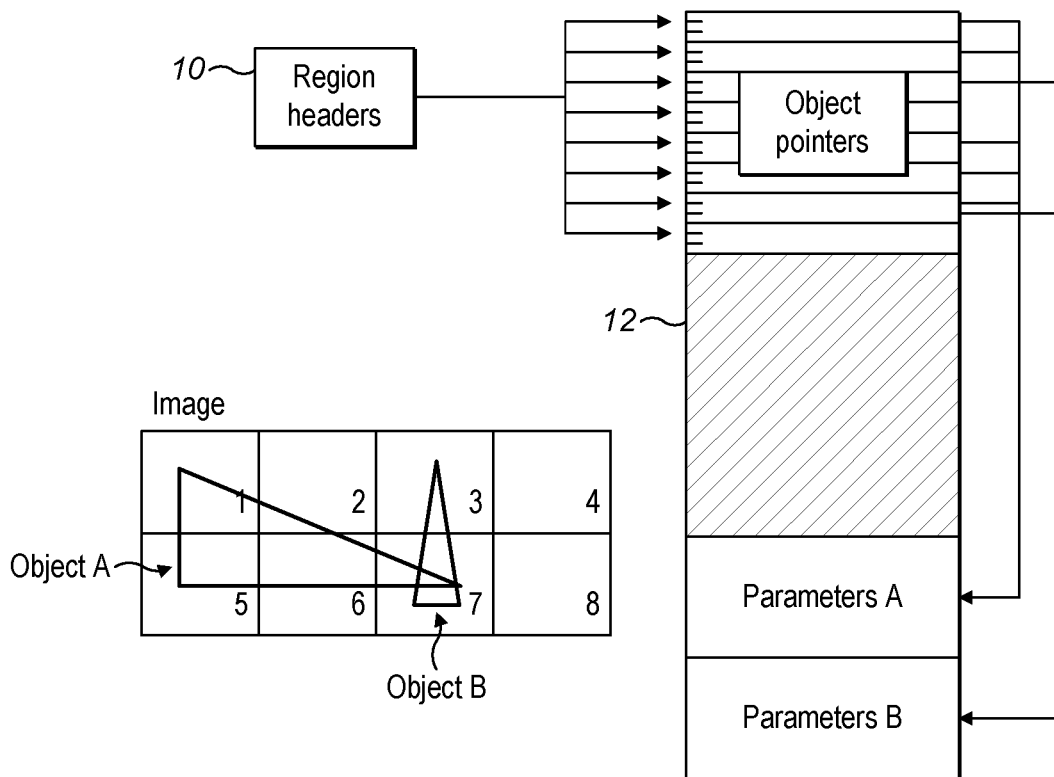
FIG. 2 shows schematically how the display list is ordered in a known tiling system.

This is then stored in the display list along with parameters pertaining to the object of which the triangle is a portion. This is shown schematically in FIG. 2 in which the region headers 10 correspond to the identities of the tiles 1-8 shown in the Figure. As can be seen, the tiles cover two triangles named object A and object B. Object A is visible in tiles 1, 2, 5, 6 and 7 and object B is visible in tiles 3 and 7.

A display list 12 receives from the tile data for the objects visible in each tile and links are provided to the parameters associated with each object, namely parameters A and parameters B in this example. Thus, it can be seen that the object pointers for tiles 1, 2, 5, 6 and 7 point to parameters A and the object pointers for tiles 3 and 7 point to parameters B. When this data is fed to the image synthesis processor 6 and texturing and shading processor 8, the correct image data will be applied to the pixels of each tile.

If the image is complex in relation to the size of the display list it may not be possible to store all the tile data in the display list simultaneously and technique which is referred to as z/frame buffer load and store is used. Therefore, the display list will be loaded with data by the tile accelerator for all the tiles until it is substantially full. This will only represent a portion of the image data. This data is then rendered by the ISP and TSP and the result stored in local memory. This is called a partial render. The image is rendered one tile at a time in the normal way. After rendering of each tile, the internal state of the ISP (containing z, stencil and object address information) is written out to external memory and image data from the TSP is written to the frame buffer. These two operations together comprise a z/frame buffer store. At the end of partial render, a render and a z frame buffer store operation has occurred for each tile on the screen.

At this point, the first part of the display list is discarded (as this data has been used for rendering the tile), and the memory is used to receive further output from the tile accelerator. When the display list memory fills up again, or when the tile accelerator reaches the end of the scene data, another partial render occurs. As processing begins for each tile in turn, the previously stored ISP data information is reloaded from external memory and, if necessary, for the blending operations to be performed, the image data from the frame buffer is loaded into the TSP. This is the z/frame buffer load operation. The next portion of the display list can then be rendered in that tile as if it had never been interrupted. Finally, after the tile is rendered, a z/frame buffer store will save the necessary data information to allow another cycle of partial renders to occur. By working in this way, it is possible to render a scene of great complexity whilst using only a limited amount of memory.

Figure 3:
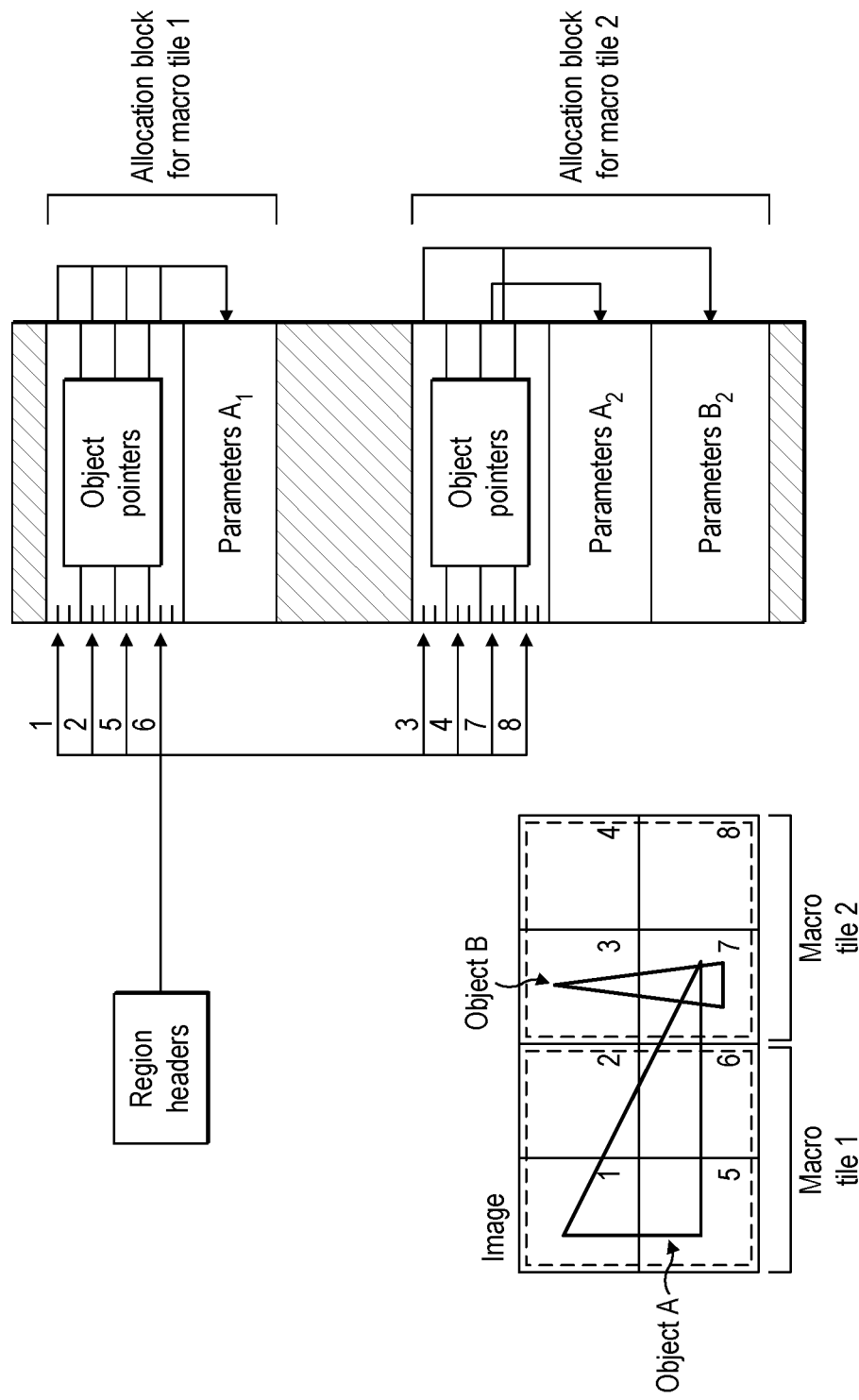
FIG. 3 shows how the display list is ordered in accordance with the macro-tiling embodying the invention.

FIG. 3 shows how the memory of the display list is allocated in an embodiment of the invention. It can be seen in FIG. 3 that the image portion shown in FIG. 1 is, in this instance, divided into two macro-tiles headed macro-tile 1 and macro-tile 2. The display list is divided into two portions, the first portion being for macro-tile 1 and the second portion for macro-tile 2. The region headers for the tiles in macro-tile 1 all feed into the object pointers for macro-tile 1. As only object A is visible in macro-tile 1, only parameters $A_I$ need to be stored in this memory block. Thus, it can be seen that the object pointers for tiles 1, 2, 5 and 6 all point into parameters $A_I$.

In macro-tile 2 both object A and object B are visible, both being present in tile 7. Thus, parameters A2 and parameters B2 have to be stored in the memory block allocation for macro-tile 2. Thus it can be seen that the object pointer for tile 7 points to parameters A2 and parameters B2 whilst the object pointer for tile 3 points only to, parameters B2.

The size of macro-tiles can be predetermined or a system can be implemented which defines the size of macro-tiles in dependence on the complexity of the scene. The macro-tiling process will be performed downstream of the basic tiling operation by the tiling accelerator 2.

The memory available in the display list storage is first divided into allocation blocks ("blocks") and the address of each block is stored in a FIFO or stack known as the free store. The choice of block sizes is a compromise between space wastage with large blocks and the storage requirements involved in managing a large number of smaller blocks. It is also influenced by the properties of the memory technology being used.

After this, the screen which has already been divided up into tiles is then divided into macro-tiles. In their simplest form, all macro-tiles on the screen are the same size which could correspond at its smallest to a single tile. In the example given in FIG. 3, a macro-tile size 2×2 is used for simplicity of illustration, although in practice the size is likely to be larger.

Initially, all allocation blocks are in the free store (not illustrated). The tiling accelerator identifies a set of tiles (and macro-tiles) that a particular object, e.g., a triangle, intersects. Then, for each macro-tile, in turn, when the first object data that crosses the macro-tile is identified, a block from the free store is claimed and becomes associated with that macro-tile. Object data is then stored in that block. Further blocks are claimed from the free store when there is insufficient space in the current blocks to store a piece of data.

Once a macro-tile has been rendered by the image synthesis processor 6 and texturing and shading processor 8, the memory block associated with it can be returned to the free store. In order to do this, blocks need somehow to be linked to the macro-tile with which they are associated. One possibility to implement this is to use a word in each allocation block to create a linked list of blocks. Alternatively, rather than adding and removing allocation blocks from the free store list, they can be marked as used or unused in situ, with links between used blocks created within the free store structure.

As explained above, the tile accelerator is used to generate a set of tiles and strip mask information for a strip of triangles in the usual way. Additionally, it determines which macro-tiles the strip falls into. The tiling accelerator 2 then writes parameter data in independent lists for each macro-tile in which the strip is visible. This parameter data is written to the display list in the appropriate place for each macro-tile. Clearly, some duplication of data will arise. However, this allows all the memory associated with a particular macro-tile to be released after that macro-tile has been rendered without affecting the display lists of other macro-tiles.

At the beginning of the first frame of image data to be displayed, tiling begins. Object pointers for the objects visible in each macro-tile are produced and written to a block from the display list allocated to that macro-tile along with the relevant object parameters for each object visible in that macro-tile. This process continues until the display list is substantially full or some threshold has been exceeded, e.g., 75% of the allocation blocks have been used. When this triggering level is reached, the systems selects a macro-tile and begins to render it into the frame buffer using the image synthesis processor and the texture and shading processor. The manner in which the macro-tile is selected is discussed in more detail below. The decision may depend on a number of factors. Typically the macro-tile that currently uses the largest number of allocation blocks will be selected since this frees up the maximum amount of memory for new data. Tiling continues in parallel with rendering for the remainder of data for the first frame. The 75% threshold is used because this leaves sufficient unused memory to be allocated by the continuing tiling process whilst other memory is rendered and subsequently returned to the free store. So that tiling can be performed-into the macro-tile which is being rendered, its region header (the pointer to the macro-tile's pointer lists and allocation block(s)) is exchanged for a pointer to an empty tile. Rendering can then continue for the data for the previous macro-tile and the tiling accelerator can write data into the new allocation block for the empty one. When the rendering of a macro-tile is complete, its allocation blocks are returned to the free store. Then, provided that the memory use is above threshold value, another macro-tile is chosen and another rendering operation begins. The 75% threshold is an adjustable parameter. This is because the ISP and TSP can perform operations such as deferred texturing more efficiently when a larger part of the display list is in memory (and most efficiently when the whole list is in memory). The threshold is adjustable to enable a balance to be found between the conflicting requirements of large display list size, and adequate space into which to tile the remainder of the scene.

When tiling of a frame of image data is complete, the system can then begin to tile the next frame, even while the rendering of the previous frame is still in progress. The allocation blocks associated with macro-tiles from the new frame must be distinct from those associated with macro-tiles from the previous frame. This can be achieved by maintaining a second set of blocks independent of those used by the previous frame. This would be achieved by maintaining independently a second set of region headers. Allocation blocks are taken from the same free store for all frames, which means that it is not necessary to double the size of the display list. This gives a further saving in memory usage. Thus, it can be seen that the z/frame buffer load and store processes occur at the beginning and end of each render respectively. They only take place with the tiles in a macro-tile that has been rendered. There is no need for a load operation before the first rendering and no need for a store after the last rendering. It can be seen that the efficiency and memory usage arises from rendering a macro-tile into the frame buffer when the number of allocation blocks used reaches some predefined threshold and that upon completion of such a render, the memory blocks associated with the macro-tile rendered are freed up, making them available for further parameter storage.

The object parameters which are stored are typically coordinates of triangles where these are the objects being rendered, object colours, etc. As can be seen, both object parameters such as these and object pointers are stored in the allocation block for each macro-tile. This allows parameters and pointers to be discarded easily when they are no longer required. The proximity of parameter and pointer data in the memory can lead to a significant reduction in the number of page breaks in the. memory system if sufficiently small allocation blocks or an appropriate layout with larger blocks is used. Page breaks reduce the performance of the memory system and are caused when consecutive accesses to the memory hardware are not within the same page. The storage of object pointers and parameter data within the same page wherever possible is an effective way to minimise these page breaks.

Various schemes from layouts of pointers and parameters within the allocation block are possible. Some examples are shown in FIGS. 4a, b and c. The simplest schemes allocate pointers in small pointer blocks at the head of the allocation block to optimise reading and writing. The last pointer in the block is a link to the next pointer block where a linked list is required. In FIG. 4a, pointers are allocated from one end of the block and parameters at the other. When the block is full the two meet in the middle. In FIG. 4b, the parameters and pointers are interleaved and the allocation block is filled from beginning to end. A further variation as shown in FIG. 4c is more suitable for allocation blocks larger than one page. It attempts to keep object pointers in the same data block as the parameter data to which they point but at the expense of some wasted space in the object pointer blocks. Because allocation blocks are associated with macro-tiles and each macro-tile contains a number of tiles, there will be multiple linked lists of object pointer blocks within each allocation block. Where a scene consists of large objects and the macro-tiles each contain a large number of tiles, it may be found that a large amount of space in the allocation blocks is wasted by pointer blocks that are mostly empty, and whose pointers all point to the same objects.

Figure 5:
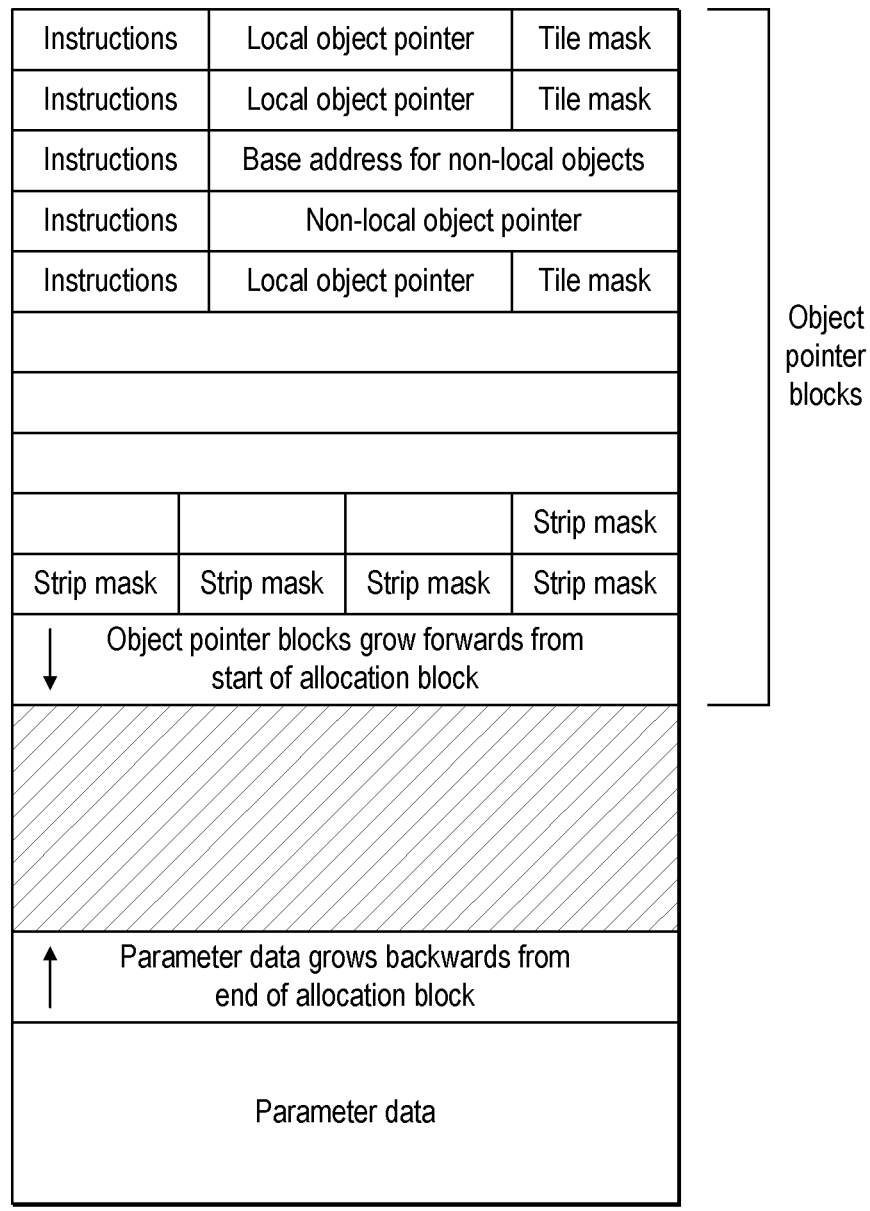
FIG. 5 shows a further embodiment of the display list.

FIG. 5 shows a scheme where a single list is used with a tile mask indicating in which of the tiles of the macro-tile the object is visible. Strip masks are separate from object pointers and are packed. The step of fetching the image synthesis processor parameters can skip to the relevant strip marks by counting the number of bits set in the tile mask.

In all the allocation schemes described above it is possible to compress object pointers by representing them using the appropriate number of least significant bits, since the pointer is always pointing to parameter data within the same allocation block. Pointers to objects outside the block (e.g., in a global list) would need to have the most significant bits of the address supplied as well. This could be by using a larger pointer.

A very large triangle or strip, i.e., one that crosses many macro-tiles can cause a problem for the scheme described above. This is because the data is replicated in many macro-tiles and thus uses a large amount of memory. One solution to this problem is to create a global list in which large objects are stored. References to these objects are then written into each macro-tile's pointer list in the normal way to ensure that the order of objects is preserved.

The object could be deemed to be large when it is visible in a number of macro-tiles greater than some threshold value. This threshold could be chosen to achieve an optimal trade-off between parameter replication, memory used by the global list and recycling of parameter memory. As the parameter data in the global list may be referenced in the pointer lists of many macro-tiles it remains in memory for a relatively long period of time. It is therefore important that the global list is not allowed to grow so large as to adversely affect the operation of the macro-tiling. A crude solution would be to render all macro-tiles when the size of the global list exceeds a threshold. This would allow all allocation blocks associated with a global list to be returned to the free store. A more elaborate scheme could employ reference counting, thereby allowing global list allocation blocks to be released as soon as the macro-tiles that reference them have been rendered.

The choice of which macro-tile to render next is generally determined by the maximum amount of memory which will be released back to the free store. This increases efficiency by ensuring that macro-tiles are able to develop a reasonable amount of complexity between renders and also reduces the total number of z/frame buffer load and store operations that are required.

When the display list contains blocks associated with macro-tiles for a number of frames, it is essential that all tiles belonging to one frame are rendered completely before rendering any tile from the next. It is easy to imagine where a busy macro-tile is being rendered and, at the same time, the tiling accelerator is writing more data into the same macro-tile. This could arise where a small area of the screen contains a particularly detailed object. In such a situation it may make sense to weight the choice of the next macro-tile to render in favour of repeating the same one. This would allow z load and store to be omitted for at least one tile in the macro-tile or for more than one if a small on-chip cache is present. For the, greatest benefit it must be possible to render the tiles in the macro-tile in an arbitrary order. When the global list becomes uncomfortably large, an extension of the reference counting scheme described above would allow a macro-tile to be chosen for rendering that will release the largest possible number of global list allocation blocks.

An alternative implementation would be to use a hierarchal macro-tile system using nested macro-tiles of progressively increasing size. This aim is to reduce replication of parameter data by selecting an appropriate level of the hierarchy for storage, depending on the number of tiles in which an object appears.

Object pointers would be stored at the lowest level only in order to preserve the order of the objects.

The macro-tiled memory management technique described above reduces the bandwidth requirements of the system considerably, but cannot eliminate z/frame buffer load and store entirely. It should also be noted that the stored z information occupies additional memory space. Compression of the z and frame buffer data reduces memory bandwidth and storage requirements still further.

A variety of compression techniques can be used that to reduce the amount of space occupied by the saved data. The efficiencies of different compression methods are affected by the nature of the data being compressed, such that a single scheme is unlikely to offer effective compression in all situations. Therefore, a hierarchical system is proposed, in which the system will fall back to an alternative method of compression if the current scheme is not appropriate to the current data set.

Alternatively, any one of the proposed methods might be used in isolation, at the risk of offering poor data compression (or even expansion) in some cases.

1) Storage of Face Plane Equations of Surfaces for z Compression

The z values in a tile are comprised of the depths of the triangles that are visible at each pixel. Although there may be many triangles processed for each tile, it is often the case that only a small number of triangles are visible, and therefore contributing to the depth values.

In the case of the z-clear polygons that occur at the beginning of most images, one polygon will define the initial z state for the entire tile.

For a given polygon, the z information is defined by the three plane parameters, A, B, and C, calculated by the ISP. The parameters are used in the equation depth=Ax+By+C, where x and y are the position of the pixel in question, with (0,0) at the top left corner of the tile.

Figure 6:
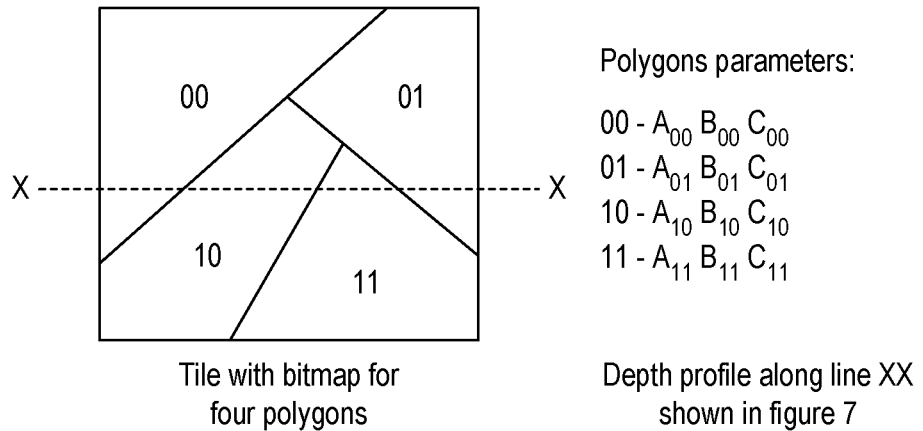
FIG. 6 shows schematically the z depths for four polygons and z compression by storage of plane parameters for the four polygons.

Storage of the A, B and C parameters requires 12 bytes of data per triangle. An additional bit map value is stored per-pixel to select between different sets of parameters. An example where the z depths are defined by four polygons is shown in FIG. 6. Compressing the data requires knowing how many polygons contribute to the z values, and the ability to recall the plane parameters for those polygons. This data could be computed from the stored object identity tags at the point where the data is output to the TSP. In the case where more than eight polygons contribute to the depths, the system would fall back to one of the alternative schemes mentioned below.

Compression rates for different numbers of triangles contributing to the depth information in a rectangular tile of 32×16 pixels are as follows:

| Num Polys | ISP Data Size | Bit map data size | Total data size |
| --- | --- | --- | --- |
| 1 | 12 bytes | 0 | 12 Bytes |
| 2 | 24 bytes | 64 bytes | 88 Bytes |
| 3-4 | 48 bytes | 128 bytes | 176 Bytes |
| 5-8 | 96 bytes | 256 bytes | 352 Bytes |

The raw floating point z data would require 2048 bytes. The method can therefore be seen to give a considerable compression ratio of between 5 and 128 times.

Reloading these depth values would require calculations similar to those that the ISP performs when processing a triangle. The depth values computed in this way would be written into the depth buffer according to the bit map data in order to reconstruct the original set of values. The example above allows the Z depth to be defined by between one and eight triangles, although other ranges could be used. If the number of triangles falls outside this range, the system can fall back to an alternative system, described below.

2) Run Length Encoding for Z Compression

Run length encoding is commonly used when data contains large numbers of consecutive items with the same value. Numbers are stored in pairs, so that, for example, the encoding 8:0.5, 24:0.8 would indicate a row of pixels where the first eight had a depth value of 0.5, and the following 24, presumably belonging to a different triangle, have a depth value of 0.8. An alternative type of run length encoding will usually prove more effective for encoding depth information, where it is quite likely that triangles are not "flat on" and therefore have depth values that change uniformly across the tile.

Figure 7:
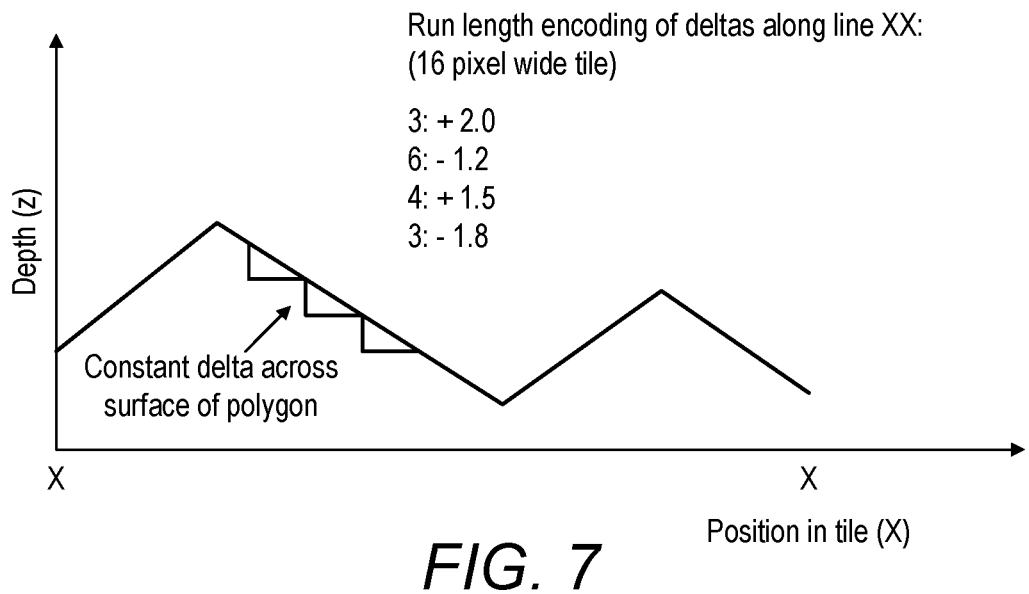
FIG. 7 shows graphically the results of run-length encoding.

This situation is shown in FIG. 7. Since triangles are planar, it is found that the "delta" values (the differences in depth between one pixel and the next) are constant. In fact, when moving across the tile in the x direction, the delta value is equal to the ISP's "A" parameter for that polygon. Run length encoding the x delta values along lines of the tile (constant y) gives a compression ratio of approximately 2 times with typical data (from experimental results).

Run length encoding (of values rather than deltas) is also highly appropriate for stencil and "tag" (the identity of the object at a particular pixel position) values, which may need to be stored along with the depth information to fully record the state of the ISP.

A disadvantage of run length encoding is that it is possible to have a situation where the data size actually expands. This would occur, for example, where no adjacent pixels are identical. The compressed data could actually double in size, since it would be necessary to store a counter indicating that each value occurs only once. In this case, the Z compression system would fall back to storing uncompressed z values.

Frame Buffer Compression

The frame buffer memory is read directly by the hardware that produces the video image, and therefore the final output cannot be compressed. However, if data is stored and loaded a number of times in the process of composing the image, memory bandwidth can be conserved by compressing the intermediate data. Standard image compression techniques, including Run Length Encoding, J-PEG, Wavelet, or Vector Quantisation (VQ) may be used.

Write Z only when changed, read TSP only on demand A final optimisation may make it possible to avoid some z stores and frame buffer loads altogether. A "dirty" flag indicates that data has been modified since it was last read. In the case of z buffer load/store, the dirty flag would be cleared when a z load occurs, and set when the z data is modified by the ISP. When a z store is requested, it is only necessary to actually save the data if the dirty bit is set.

A similar optimisation can be applied to frame buffer loads and stores. It is only necessary to load pixels from the frame buffer when they are required by a particular blending operation, and this situation may not always arise. Similarly, a dirty flag would indicate pixels or groups of pixels which have been modified, and only those pixels would be transferred by a frame buffer store operation.

5) Allowing the Application to Access the "z-Buffer" if it Wants to

Some rendering systems such as the Imagination Technologies Power Vr System do not normally need to maintain a z buffer for the entire frame. This saves memory, and bandwidth. Some applications, however, expect to see a z buffer, and attempt to manipulate it themselves in order to achieve special graphical effects. Although the data stored by the z buffer store operations is not a z buffer in the conventional sense, it is possible to make it appear as such to the application, by taking care over the layout of data in memory. If necessary additional z buffer store operations can be performed to ensure that the saved z values reflect the state of the imaginary z buffer at the appropriate times.

A conventional z buffer contains raw, uncompressed z data. Clearly, any application that attempted to read a z buffer compressed using the methods described above would be unable to interpret it correctly. It is essential therefore, that there is a facility to either switch off the compression for those applications that require it, or to provide additional hardware that presents a "virtual" z buffer to the application, and performs compression and decompression transparently.

Figure 8:
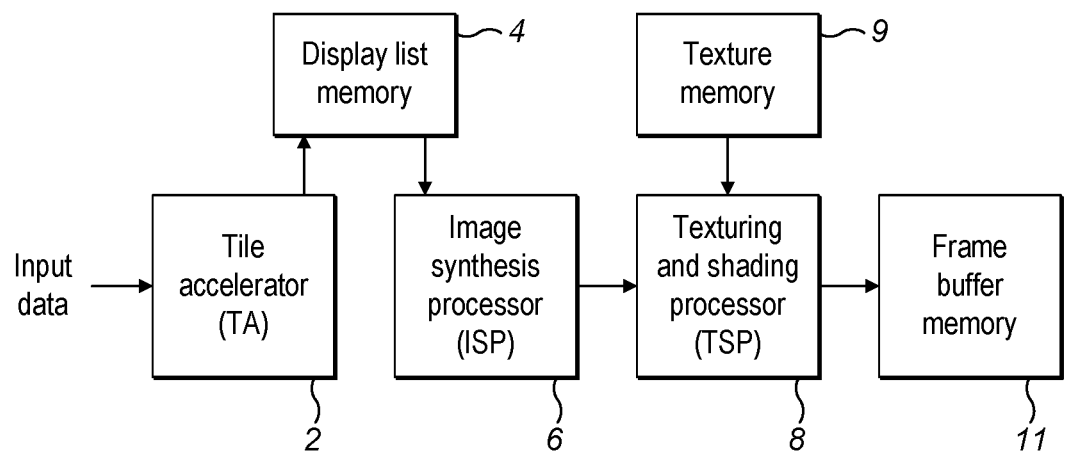
FIG. 8 shows a block diagram f an example of the type of rendering system with which the present invention may be used.
Figure 9:
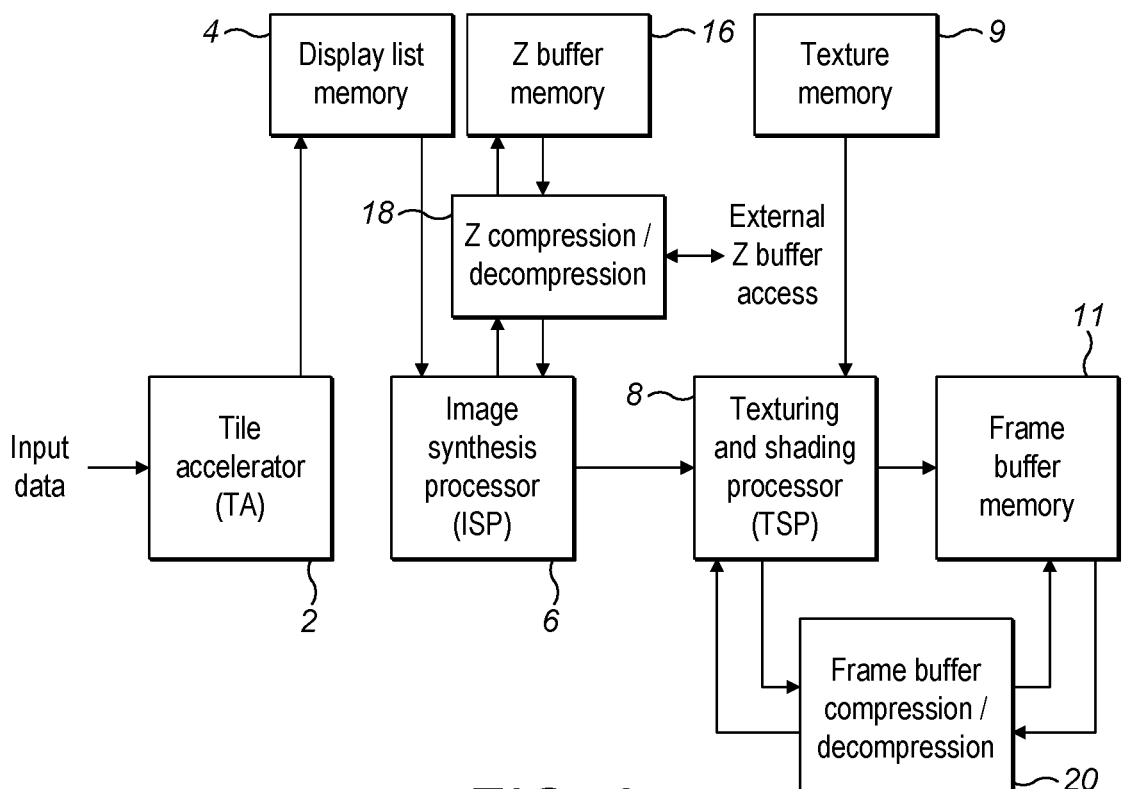
FIG. 9 shows the system of FIG. 8 in an embodiment of one aspect of the present invention.

Diagrams illustrating an embodiment of the invention now follow. FIG. 8 shows the block diagram of the type of system to which the invention is applied. This comprises a slightly amplified version of FIG. 1 and shows a tile accelerator 2 performing tiling operations which are supplied to a display list memory 4. This in turn supplies data to an image synthesis processor 6 for performing ray/surface intersection tests. After this data is supplied to a texture and shading processor 8 which applies texture and shading data, from a texture in memory 9 before storing the textured image data in frame buffer memory 11. This apparatus operates in accordance with the description given earlier with relation to FIG. 1. FIG. 9 shows this system FIG. 8 modified by circuitry to perform a Z/frame buffer load and store operation. In this, a Z buffer memory 16 is linked to the image synthesis processor 6 via a z compression/decompression unit 18. This comes into operation when the system is rendering a complex scene and the display list memory is not large enough to contain all the surfaces which need to be processed for a particular tile. This process has been described previously. However, when operating using the system of FIG. 9, the display list will be loaded with data by the tile accelerator for all the tiles until it is substantially full. This may, however, only represent a portion of the initial data. The image is rendered one tile at a time by the image synthesis processor 6. The output data for each tile is provided to the texture and shading processor 8 which uses data from the texture memory 9 to texture the tile and supply it to the frame buffer memory 11.

At the same time, because the image data was incomplete, the result from the image synthesis processor 6 is stored to z buffer memory 16 via the compression/decompression unit 18 for temporary storage. The rendering of the remaining tiles then continues with the incomplete image data until all the tiles have been rendered and stored in frame buffer memory and in the z buffer memory 16.

The first part of the display list is then discarded and the additional image data read into it. As processing is performed for each tile in turn by the image synthesis processor 6 the relevant portion of data from the z buffer memory 16 is loaded via the z compression/decompression unit 18 so that it can be combined with the new image data from the display list memory 4. The new data for each tile in turn is then fed to the texture and shading processor 8 which combines it with data from texture memory 9 before supplying it to the frame buffer 11. This process continues for all the tiles in the scene and until all the image data has been rendered. Thus, it can be seen that the z buffer memory fills a temporary store which enables a smaller display list memory to be used than would be necessary for rendering particularly complex scenes. The compression/decompression unit 18 is optional but its use enables a smaller z buffer memory to be employed.

A frame buffer compression/decompression unit 20 is provided as an additional link between the texture and shading processor and the frame buffer memory. Preferably, this is used for temporary storage of incomplete image data in the frame buffer memory and for feeding back that data when additional data is provided from the image synthesis processor 6 for a tile which has to be combined with the data already textured and shaded for that tile. This compression/decompression unit is of course optional.

Figure 10:
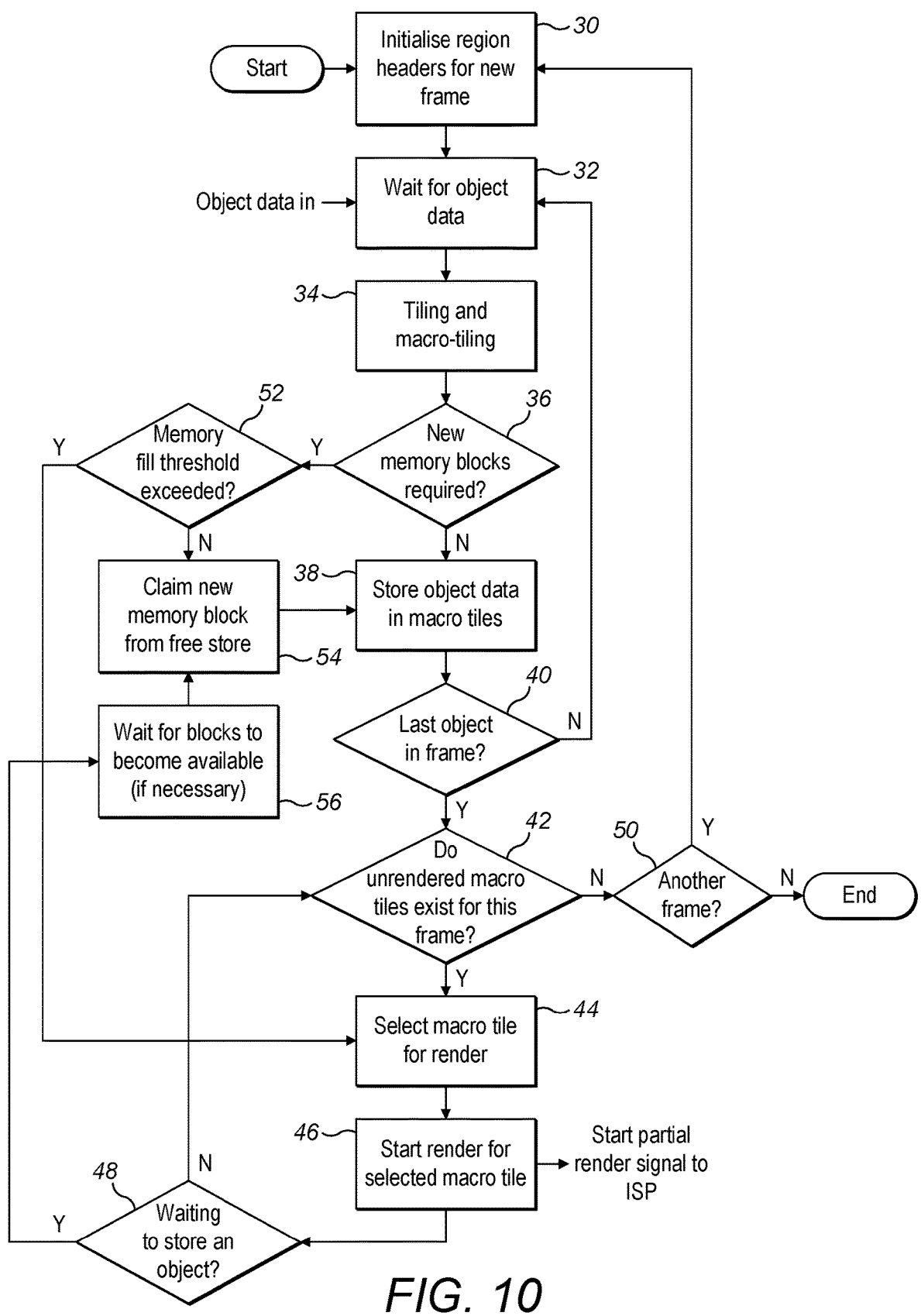
FIG. 10 is a flow chart illustrating the memory management used by an embodiment of the invention.

In FIG. 10 the memory management system used by the tiling accelerator is illustrated. This should be read in combination with the description of FIG. 3. At step 30, the region headers are initialised and step 32 the system waits for object data to be input for the regions. At 34 tiles and macro tiles are allocated as illustrated in FIG. 3 and at 36 its determination is made as to whether or not any new memory blocks are required. If additional memory blocks are not required then object data in macro tiles is stored in memory blocks as previously allocated by the system whilst at 40 the determination is made as to whether or not the last object in the frame has been reached in the allocation of object data to macro tiles and memory. At 42 determination is made as whether or not any unrendered macro tiles exist for the frame if they do then at Step 44 a macro tile is selected for rendering and the rendering commenced at 46 before a determination is made at 48 as to whether or not additional objects are required to be stored and rendered. If the answer is no then at 42 a determination is made as to whether another tile is to be rendered and if no further macro tiles exist, a determination is made at 50 as to whether another frame or data is to be entered. If it is, the system returns to the top of the flow diagram. If not this process terminates. If the determination at 42 is yes then control flows to FIG. 6 for new blocks from memory to be loaded.

If at step 36 a determination is made that additional memory is required then at step 52 a determination is made as to whether or not the memory fill threshold has already been exceeded. If it is not then at 54 new memory blocks are claimed from the free store at 54 and are used at 38 to store object data in macro tiles before proceeding to step 40 as before. If the memory fill threshold has been exceeded then the process skips to step 44 where macro tiles are rendered. If this route is taken at step 48 the determination will be that the system is waiting to store an object. In which case the process will activate step 56 which will wait until memory blocks are available before they can be claimed at step 54 for storing additional objects in macro tiles at step 38.

Figure 11:
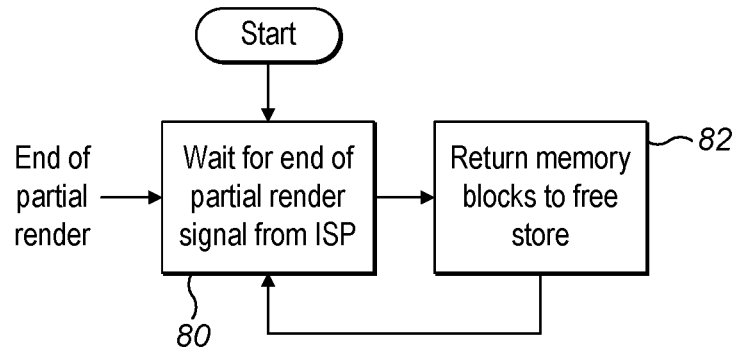
FIG. 11 is a flow chart for sub-process of the flow chart FIG. 10.

FIG. 11 illustrates how memory blocks are freed and returned to store for future allocation by the tile accelerator. At 80, the system is activated to wait for a signal that a partial render has been completed. When this is received, memory blocks are returned to store at 82 and the system waits for the end of the next partial render. Because tiling and rendering occur in parallel, this freeing up of memory blocks is illustrated separately in FIG. 10, at 46 a render is commenced by sending a signal to the ISP. It doesn't wait for it to complete, because the tile accelerator can be performing more tiling work in that time. This is why there is a threshold (e.g. 79%) at which rendering of macro tiles commences. This leaves the unfilled portion of memory for the tile accelerator to work with. The system of FIG. 11 waits for the ISP to indicate that a partial render is complete because it doesn't know the stage in the cycle at which the tile accelerator is and doesn't wish to interrupt it. FIG. 11 simply releases what memory it can, such that when steps 56 and 54 in FIG. 10 are reached. There is a good chance that the memory will be immediately available for use. It is necessary sometimes to wait at 56 because memory will not always be available. This may occur with complex images and it is then necessary to wait for memory to become available.

Figure 12:
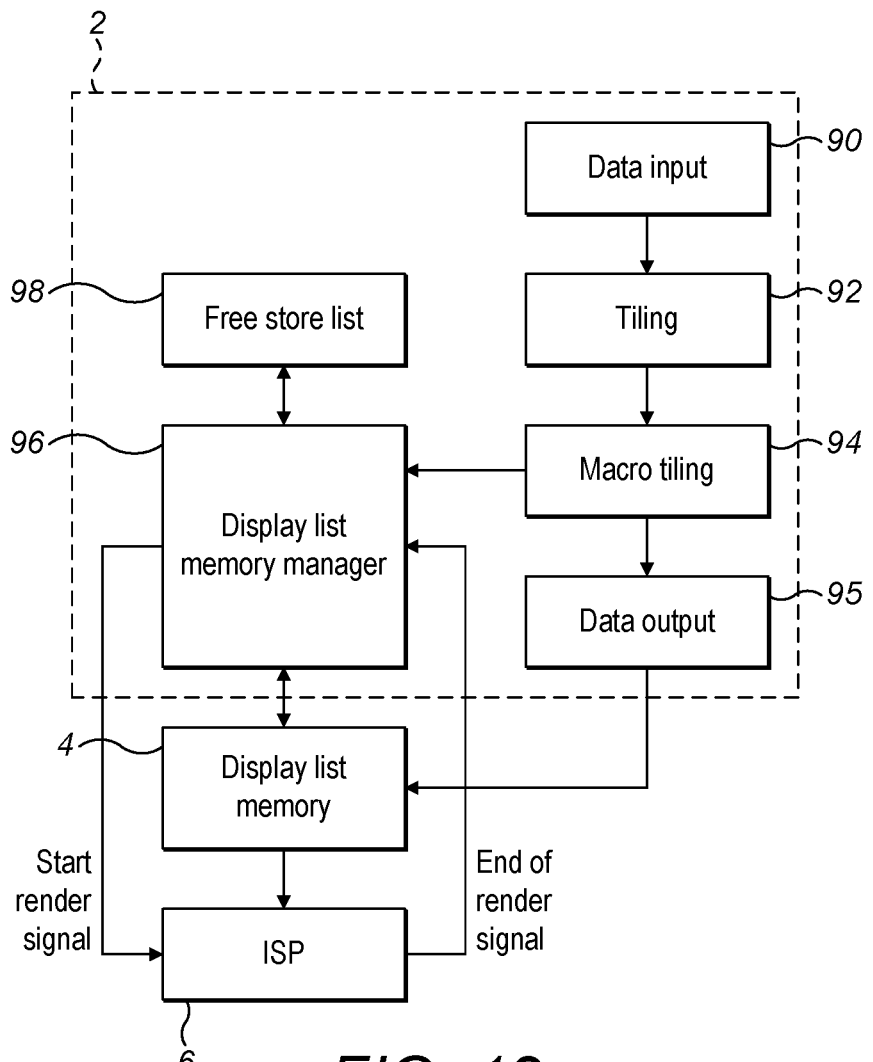
FIG. 12 is a block diagram of the tile accelerator used in the embodiment of the invention.

FIG. 12 shows the ISP 6 and display list memory 4 at FIGS. 8 and 9 but with the tile accelerator 2 shown in more detail. Input data 90 passes to a tiling unit 92. and this data then passes to a macro-tiling unit 94. Output data 95 from this passes to the display list memory 4 and also to a display list memory manager 96. The memory manager 96 is in communication with the free store list 98 and with the display list 4. It receives a signal from the display list 45 to indicate that the memory is e.g. 75% full and in response to this sends a start render signal to the ISP6. When this is complete an end render signal is sent to the memory manager 96 which returns the memory now made available to the free store list 98 for use by further macro tiles. The memory manager continues-to receive macro-tile data, whilst previous macro-tiles are being rendered, and allocates memory from the free store list to the objects in these as required.

What is claimed is:

1. A method of rendering in a graphics system having an image plane subdivided into a plurality of tiles, the method comprising:

deriving depth data from object data for a tile;
compressing the depth data;
storing the compressed depth data in a memory;
retrieving the compressed depth data stored in the memory and decompressing the compressed depth data;
deriving, from additional object data for the tile and the retrieved data, shading data for the tile; and
providing the shading data for further rendering or display.

2. The method according to claim 1, wherein the depth data relates to a polygon representable by a planar equation, the planar equation being defined by a set of parameters, and the method further comprises compressing the depth data by storing the set of parameters.

3. The method according to claim 2, wherein the planar equation is of the form, depth=Ax+By +C, and where A, B and C define the set of parameters.

4. The method according to claim 1, wherein the depth data relates to a plurality of polygons, each polygon of the plurality of polygons being representable by a respective planar equation, and each planar equation being defined by a respective set of parameters, and the method further comprises compressing the depth data by storing the sets of parameters.

5. The method according to claim 4, wherein the tile comprises a plurality of pixels, and the method further comprises compressing the depth data by storing a bit map value for each pixel of the plurality of pixels, the bit map value indicating which set of parameters relates to that pixel.

6. The method according to claim 4, wherein each planar equation is of the form, depth=Ax+By +C, and where A, B and C define the respective set of parameters.

7. The method according to claim 1, further comprising compressing the depth data by performing run length encoding of sequential pixel depth values forming the depth data.

8. The method according to claim 7, wherein, where the sequential pixel depth values change uniformly for a sequence of pixels across at least a portion of the tile, the method further comprises performing run length encoding by storing a number of pixels pertaining to the sequence of pixels and a delta value representing the change in depth between each successive pixel depth value for the sequence of pixels.

9. The method according to claim 8, further comprising compressing the depth data for a sequence of pixels along a constant-y direction of the tile by performing run length encoding of the delta values in the x-direction.

10. The method according to claim 1, wherein the additional object data comprises additional depth data.

11. The method according to claim 1, wherein the additional depth data relates to an additional object.

12. The method according to claim 1, wherein the depth data relates to a plurality of polygons, each polygon of the plurality of polygons being representable by a respective planar equation, and each planar equation being defined by a respective set of parameters;
the method further comprising:
determining the number of polygons needed to represent the depth data; and
where it is determined that the number of polygons is 8 or fewer, compressing the depth data by storing parameters representing a planar equation in respect of each polygon, and
where it is determined that the number of polygons is greater than 8, compressing the depth data by performing run length encoding of sequential pixel depth values forming the depth data.

13. An apparatus for rendering in a graphics system having an image plane subdivided into a plurality of tiles, the apparatus comprising:
at least one processor configured to:
derive depth data from object data for a tile;
compress the depth data;
store the compressed depth data in a memory;
retrieve the compressed depth data stored in the memory and decompress the compressed depth data;
derive, from additional object data for the tile and the retrieved data, shading data for the tile; and
provide the shading data for further rendering or display.

14. The apparatus according to claim 13, wherein the depth data relates to a polygon representable by a planar equation, the planar equation being defined by a set of parameters, and the at least one processor being further configured to compress the depth data by storing the set of parameters.

15. The apparatus according to claim 14, wherein the planar equation is of the form, depth=Ax+By +C, and where A, B and C define the set of parameters.

16. The apparatus according to claim 13, wherein, where sequential pixel depth values forming the depth data change uniformly for a sequence of pixels across at least a portion of the tile, the at least one processor is further configured to perform run length encoding by storing a number of pixels pertaining to the sequence of pixels and a delta value representing the change in depth between each successive pixel depth value for the sequence of pixels.

17. The apparatus according to claim 13, wherein the depth data relates to a plurality of polygons, each polygon of the plurality of polygons being representable by a respective planar equation, and each planar equation being defined by a respective set of parameters;
the at least one processor being further configured to:
determine the number of polygons needed to represent the depth data; and
where it is determined that the number of polygons is 8 or fewer, compress the depth data by storing parameters representing a planar equation in respect of each polygon, and
where it is determined that the number of polygons is greater than 8, compress the depth data by performing run length encoding of sequential pixel depth values forming the depth data.

18. A method for managing memory in a system for generating 3-dimensional computer images comprising:
storing, in a memory, object data pertaining to objects in an image which fall in one or more rectangular area of a plurality of rectangular areas into which the image is subdivided, by
i) allocating at least one portion of the memory to each rectangular area and storing in that portion object data pertaining to objects in the respective rectangular area, and
ii) allocating at least one portion of the memory as a global list and storing in the global list object data pertaining to objects falling in more than one rectangular area;
supplying object data for each rectangular area from the respective portion of the memory and, if the rectangular area contains objects also falling in at least one other rectangular area, also from the global list;
deriving depth data in dependence on the object data for each rectangular area;
deriving shading data in dependence on the depth data; and
storing the shading data for display.

19. The method according to claim 18, the method further comprising allocating the at least one portion of the memory allocated to each rectangular area and the at least one portion of memory allocated as the global list from unused portions of the memory according to requirements, such that the size and location of the at least one portion of the memory allocated to each rectangular area and the size and location of the at least one portion of the memory allocated as the global list dynamically change as the method is performed.

20. The method according to claim 18, wherein the global list is arranged to store object data pertaining to objects falling in more than one rectangular area and object data pertaining to objects falling in a single rectangular area but close to the boundary with another rectangular area.

* * * * *

UNITED STATES PATENT AND TRADEMARK OFFICE
CERTIFICATE OF CORRECTION

Page 1 of 1

PATENT NO. : 11,004,172 B2
APPLICATION NO. : 16/734311
DATED : May 11, 2021
INVENTOR(S) : Stephen Morphet It is certified that error appears in the above-identified patent and that said Letters Patent is hereby corrected as shown below:

On the Title Page

Item [30], insert:
--November 15, 2000   (GB)................. 0027897.8
June 8, 2000          (GB)................. 0014037.6--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*